(12) United States Patent
Zhang et al.

(10) Patent No.: US 11,342,095 B2
(45) Date of Patent: May 24, 2022

(54) INSULATION MATERIAL FOR A DC ELECTRICAL COMPONENT (71) Applicant: HITACHI ENERGY SWITZERLAND AG, Baden (CH)

(72) Inventors: Yibo Zhang, Beijing (CN); JianSheng Chen, Beijing (CN); Lise Donzel, Wettingen (CH); Pierre Elser, Zürich (CH); Robin Gremaud, Zürich (CH); ZhiQiang Tao, Beijing (CN); Rico Gasparini, Ennetbaden (CH); Ulrich Straumann, Winterthur (CH); Uwe Riechert, Glattfelden (CH)

(73) Assignee: HITACHI ENERGY SWITZERLAND AG, Baden (CH)

( * ) Notice: Subject to any disclaimer, the term of this patent is extended or adjusted under 35 U.S.C. 154(b) by 0 days.

(21) Appl. No.: 16/593,379

(22) Filed: Oct. 4, 2019

(65) Prior Publication Data
US 2020/0035375 A1 Jan. 30, 2020

Related U.S. Application Data (63) Continuation of application No. PCT/CN2017/079411, filed on Apr. 5, 2017.

(51) Int. Cl.
*H01B 3/00* (2006.01)
*C08K 3/22* (2006.01)
*H02G 15/08* (2006.01)

(52) U.S. Cl.
CPC .............. *H01B 3/002* (2013.01); *C08K 3/22* (2013.01); *H02G 15/08* (2013.01);
(Continued)

(58) Field of Classification Search
CPC . H01B 3/00; H01B 3/004; C08K 3/22; C08K 2003/2241; C08K 2003/2251; C08K 2003/2265
See application file for complete search history.

(56) References Cited

U.S. PATENT DOCUMENTS

2007/0199729 A1   8/2007   Siegel et al.
2014/0022039 A1   1/2014   Weinberg
(Continued)

FOREIGN PATENT DOCUMENTS

CN   1138233 A    12/1996
CN   1902716 A    1/2007
(Continued)

OTHER PUBLICATIONS

Parthibavarman et al "Effect of copper on structural, optical, and electrochemical properties of SnO2 nanoparticles", Journal of Optoelectronics and Advanced Materials, vol. 12, No. 9, Sep. 2010, p. 1894-1898.*
(Continued)

*Primary Examiner* — Mark Kopec
(74) *Attorney, Agent, or Firm* — Sage Patent Group (57) ABSTRACT An insulation material for a DC electrical component. The insulation material includes a thermoset or thermoplastic matrix and a functional filler component. The functional filler component has a non-linear DC conductivity depending on an applied electrical field strength. At least in a temperature range of 0° C. to 120° C., the functional filler component has a bandgap in the range of 2 to 5 eV, and optionally in the range of 2 to 4 eV. Furthermore, a method for producing an insulation material, a use of an insulation material for a high voltage DC electrical component, a DC electrical component comprising the insulation material and the use of a DC electrical component comprising the insu-
(Continued)

lation material in a high voltage DC gas insulated device are suggested.

10 Claims, 7 Drawing Sheets

(52) U.S. Cl.
CPC ............ *C08K 2003/2227* (2013.01); *C08K 2003/2231* (2013.01); *C08K 2003/2237* (2013.01); *C08K 2003/2251* (2013.01); *C08K 2003/2265* (2013.01); *C08K 2201/001* (2013.01)

(56) References Cited

U.S. PATENT DOCUMENTS

| | | | | |
|---|---|---|---|---|
| 2016/0027549 | A1* | 1/2016 | Lang | C08K 3/34 428/447 |
| 2017/0250008 | A1* | 8/2017 | Somasiri | H01B 17/32 |
| 2018/0158573 | A1* | 6/2018 | Ho | H01B 13/141 |
| 2019/0080816 | A1* | 3/2019 | Nam | C08K 3/04 |

FOREIGN PATENT DOCUMENTS

| | | |
|---|---|---|
| CN | 102391646 A | 3/2012 |
| CN | 103214850 A | 7/2013 |
| CN | 103222016 A | 7/2013 |
| CN | 105331110 A | 2/2016 |
| DE | 4037972 A1 | 6/1991 |
| EP | 0440865 A1 * | 8/1991 |
| EP | 2595157 A1 * | 5/2013 |
| JP | H0547215 A | 2/1993 |
| WO | 2004038735 A1 | 5/2004 |
| WO | 2005/036563 A2 | 4/2005 |
| WO | 2005/036563 A3 | 4/2005 |
| WO | 2005036563 A2 | 4/2005 |
| WO | 2011/128147 A1 | 10/2011 |
| WO | 2016/101988 A1 | 6/2016 |

OTHER PUBLICATIONS

State Intellectual Property Office of the P.R. China, International Search Report & Written Opinion issued in corresponding Application No. PCT/CN2017/079411, dated Jan. 5, 2018, 14 pp.

Chinese First Office Action and Search Report with English translation for Chinese application No. 201780089400.6 dated Jul. 22, 2020, 10 pages.

Plesa et al., "Properties of Polymer Composites Used in High-Voltage Applications", published Apr. 28, 2016, XP55333105A, 64 pages.

* cited by examiner

INSULATION MATERIAL FOR A DC ELECTRICAL COMPONENT

FIELD OF THE DISCLOSURE

The present disclosure relates to an insulation material for a DC electrical component. Furthermore, the present disclosure relates to a method for producing the insulation material. Further, the present disclosure relates to a use of an insulation material for a high voltage DC electrical component. Also, the present disclosure relates to a high voltage DC (HVDC) electrical component comprising a conductor surrounded at least partially by an insulation layer of the insulation material. Still further, the present disclosure is concerned with the use of a DC electrical component in a high voltage DC gas insulated device.

BACKGROUND ART

In recent years, the demand of high voltage DC equipment (e.g., cables, bushings and cable joints) has increased considerably. In HVDC equipment, the insulation materials which are used have to exhibit specific properties, in particular specific electrical properties. In particular, the electrical behavior of a specific insulation material in AC applications is not comparable to the behavior it exhibits in DC applications, such that most known insulation materials which are suitable for AC applications cannot be used in the DC regime. For example, a charge accumulation may occur on the surface of conventional insulators comprising existing materials. This, in turn, leads to a distortion of the surface potential and/or a reduction of the breakdown strength of the entire HVDC system which uses such an insulator. Such an accumulation of charges does virtually not occur in the AC regime, which is one of the reasons why conventional insulation materials are not designed taking these effects in account. Thus, an insulation material should provide specific properties that make it usable in DC applications, while preventing a thermal runaway at the same time.

Conventional insulation materials for the AC regime may contain filler materials such as aluminum oxide. While a mere addition of aluminum oxide filler particles can change the capacitive behavior of an insulator when used for AC, the effects on surface charging and field distortion in the DC regime are very limited.

Figure 4:
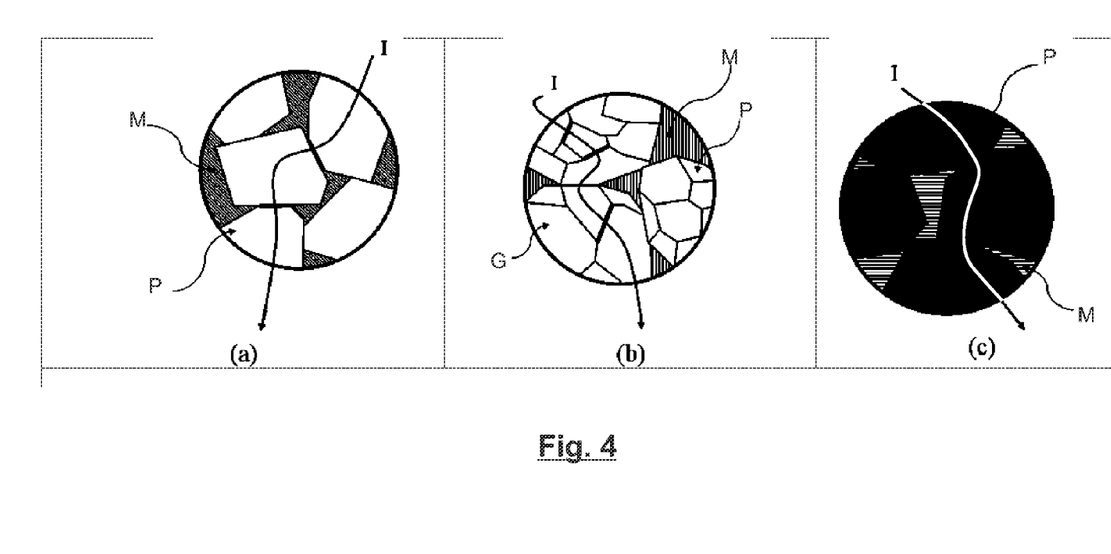
FIG. 4a is a diagram showing a schematic view of the microstructure inside field grading materials based on SiC, for explanatory purposes.
FIG. 4b is a diagram showing a schematic view of the microstructure inside field grading materials based on ZnO microvaristors, for explanatory purposes.
FIG. 4c is a diagram showing a schematic view of the microstructure inside field grading materials based on $Cr_2O_3$, $Fe_2O_3$, $TiO_2$, $ZnS$, and $SnO2$, for explanatory purposes.

Field grading materials are an established means for effectively and reliably controlling the electric field in electrical applications. Widespread fillers for providing a non-linearity of the current voltage characteristics (field-grading) are e.g. silicon carbide (SiC), or microvaristors (ZnO). FIG. 4 shows schematically different configurations of a material which exhibits non-linear current voltage characteristics for field grading. A reference symbol M indicates a matrix component, while P indicates a particle component and G indicates a grain. A possible current path I through the material is schematically shown and denoted with a reference symbol I. Field grading is provided in SiC or microvaristors of ZnO by interfaces between or within the particle of the filler. In FIG. 4a which shows a SiC-based material, a particle-particle contact (shown by thick black lines) is responsible for the nonlinearity of the current-voltage characteristics. In FIG. 4b which shows a microvaristor-based ZnO material, a grain boundary (shown by thick black lines) is responsible for the nonlinearity of the current-voltage characteristics. Finally, in FIG. 4c, the whole particle (in black) is responsible for the non-linearity of the current-voltage characteristics. Such materials show a strong non-linear behavior, which is of clear advantage for certain applications such as surge arresters or machine insulation. However, these fillers have the following limitations:

Accurate control of doping of interfaces, as well as grain/particle size is needed to ensure a constant performance of the field grading performance. This implies that a well-controlled process is necessary for the production of microvaristor powder. For SiC, continuous monitoring of the electrical and morphological properties of the filler's powder as well as blending from various powder batches is required to ensure constant, desired performance.

For an application as insulation materials for DC components, where a weak non-linear behavior is needed and large components with a high amount of filler used, a different approach is needed. We propose here an intrinsically robust alternative solution for cost-effective fillers with weak field grading and low conductivity characteristics for high filling content in a polymer matrix for DC insulation components. It is therefore an object of the present disclosure to provide an improved insulation material which can be used in the DC regime, particularly in DC or HVDC systems. It is desired to have an intrinsically robust solution for obtaining an insulation material, which is cost-effective, has a weak field grading and low conductivity characteristics for a high filling content in a polymer matrix for DC insulation components.

In view of the above, an insulation material according to claim 1 is suggested, as well as a method according to claim 10 for producing an insulation material and a DC electrical component according to claim 7 making using of the insulation material.

BRIEF DESCRIPTION OF THE DISCLOSURE

According to an aspect of the present disclosure, an insulation material for a DC electrical component is suggested, the insulation material comprising a thermoset or thermoplastic matrix and a functional filler component. The functional filler component has a non-linear DC conductivity depending on an applied electrical field strength. At least in a temperature range of 0° C. to 120° C., the functional filler component has a bandgap in the range of 2 to 5 eV, optionally in the range of 2 to 4 eV.

In embodiments, the functional filler component comprises a semiconductor material.

In embodiments, the total amount of the functional filler component within the insulation material is within the range of 30 to 80 wt-%, optionally within the range of 55 to 75 wt-% or within the range of 58 to 70 wt-%.

In embodiments, a DC conductivity of the insulation material, measured after the application of a constant and homogeneous electric field of a field strength under normal DC operation for a time duration equal or longer than $10^5$ seconds, is within the range of $10^{-18}$ S/m to $10^{-10}$ S/m, optionally within the range of $10^{-17}$ S/m to $10^{-12}$ S/m or within the range $10^{-15}$ S/m to $10^{-13}$ S/m for 303 to 378 K.

In embodiments, a DC conductivity is dependent on the electric field strength applied to the insulation material at a temperature of the insulation material of any one temperature within the range between 303 and 378 K, for the electric field strength being in a range between a minimum electric field strength of 1 kV/mm and a maximum electric field strength of 10 kV/mm, such that the DC conductivity at the maximum electric field strength is less than $10^5$ times the DC conductivity at the minimum electric field strength, optionally for an electric field strength being in a range between a minimum electric field strength of 1 kV/mm and a maximum electric field strength of 5 kV/mm, such that the DC conductivity at the maximum electric field strength is less than $10^3$ times the DC conductivity at the minimum electric field strength.

In embodiments, a DC conductivity is dependent on the temperature of the insulation material at any one field strength within the range between 0 kV/mm and 10 kV/mm, such that the DC conductivity at the maximum temperature is less than $10^4$ times the DC conductivity at the minimum temperature, optionally $10^3$ times the DC conductivity at the minimum temperature or $10^2$ times the DC conductivity at the minimum temperature.

In embodiments, the semiconductor material of the functional filler component comprises any one of the group of: p-type chromium oxide, p-type iron oxide, p-type titanium oxide, p-type zinc sulfide.

In embodiments, the semiconductor material of the functional filler component comprises any one of the group of: n-type iron oxide, n-type titanium oxide, n-type zinc sulfide, n-type tin oxide.

Preferably, the insulation material suggested herein is suitable for use with a high voltage DC electrical component. High voltage, as used herein, follows the definition of the International Electrotechnical Commission and is therefore regarded, in the DC regime, as a voltage exceeding 1500 Volts vis-à-vis a reference potential such as a mass potential of a DC device or a ground potential. Preferably, high voltage DC components employing the insulation material as suggested herein are rated for even higher voltages, for examples for voltages of 50 kV or higher or of 150 kV or higher.

It was surprisingly found that adding to the insulation material a functional filler component as described above can lead to an advantageous stabilization of a DC electric field applied to an insulator which is, at least partially, constituted of the insulation material suggested herein.

Particularly, the stabilization of the DC field is achieved in a faster manner when employing the insulation material suggested herein, compared with a conventional insulation material comprising aluminum oxide-filled resin.

Furthermore, it was found that the insulation material suggested herein may lead to a reduced charge accumulation, as compared to a conventional insulation material employed in the DC regime. A reduced charge accumulation was particularly observed in the vicinity of a flange-insulator transition when the insulation material was employed in a gas-insulated HVDC system, in the vicinity of insulator protrusions or on other surface inhomogeneities of an insulator employing the suggested insulation material, but those examples are not to be understood as limiting.

Moreover, it was found that the insulation material suggested herein may lead to a better dissipation of accumulated surface charges, as compared to a conventional insulation material employed in the DC regime.

A suitable amount of filler within the suggested insulation material can help to ensure a sufficient conductivity for alleviating charge accumulation on an insulator surface, while at the same time avoids a uncontrolled heating by ohmic losses (hereinafter referred to as "thermal runaway") and ensures sufficient mechanical stability of the matrix after polymerization.

In embodiments, the insulation material further comprises a bulk filler component, wherein the amount of the bulk filler component in the insulation material is within the range of up to 50 wt.-%, optionally within the range of 20 to 40 wt.-%.

The skilled person will understand that within those ranges, the total amount of the functional filler component and the bulk filler component will not exceed a ratio to the matrix material that would make it impossible for the matrix material to polymerize. Particularly, the total amount of the functional filler component and the bulk filler component, i.e. the total amount of the filler, within the insulation material does not exceed 80 wt.-%.

Again, a suitable amount of the functional filler component and/or the bulk filler component within the suggested insulation material can help to ensure a sufficient conductivity for alleviating charge accumulation on an insulator surface, while at the same time avoids a thermal runaway and ensures sufficient mechanical stability of the matrix after polymerization.

Proposed functional filler materials may have naturally the desired volume conductivity. As the filling content is comparatively high, a percolation path is achievable through the composite, resulting in a conductivity that is controlled by—and of the same order of magnitude as—the conductivity of the filler.

In general, parameters controlling the conductivity in a semiconductors—here used as a functional filler component—are the density of free majority carriers n (free electron or hole density, depending on the majority carrier), and the mobility $\mu$ of these carriers:

Conductivity $\sigma=\mu ne$, with e the elementary charge.

The density of free carrier n is determined in large bandgap insulators either by doping or e.g. departing from the stoichiometry, i.e. for oxides, oxygen surplus or deficiency.

Another criterion is to avoid large bandgap insulators, as doping would lead to deep localized state that do not contribute to conduction. These criteria lead to the present features of a bandgap of the functional filler component between 2 and 5 eV. As an example, oxides and sulfide have a bandgap between 2 and 5 eV.

Table 1 below shows functional filler components and their respective bandgaps.

TABLE 1

| functional filler component | bandgap [eV] | n-or p-semiconductor | Remark |
|---|---|---|---|
| $Cr_2O_3$ | 3.3 | p | Hole concentration from oxygen excess ($Cr_2O_3$). n-type not observed naturally. |
| $Fe_2O_3$ | 2.4 | n | p also possible by controlled doping. |
| $TiO_2$ | 3.1 | n or p | Depending on oxygen concentration or doping. |
| ZnS | 3.8 | n | p-type also possible by Cu-doping. |
| $SnO_2$ | 3.8 | n | n-type by oxygen deficiency. |

Oxides exhibiting p-type conduction are advantageous as a functional filler component for high-voltage DC insulation. The reason is a generally comparatively lower majority carrier mobility than in n-type oxides due to the strong localization of holes at oxygen 2p levels or an upper edge of the valence band due to the high electronegative nature of oxygen. In other words, the holes have high probability to be localized around the oxygen atoms. Hence these holes require high enough energy to overcome a large barrier height in order to migrate within the crystal lattice and exhibit low mobility, limiting the conductivity. According to a further aspect of the present disclosure, the functional filler component is any one of the group of: conductive titanium oxide, silica with antimony-doped tin oxide, titanium-oxide with antimony-doped tin oxide, chromium oxide ($Cr_2O_3$), iron oxide ($Fe_2O_3$), titanium oxide ($TiO_2$), zinc sulfide (ZnS), tin oxide ($SnO_2$).

An example for a conductive titanium oxide is an alloy of $TiO_2$ [$SnO_2$, $Sb_2O_3$]. However, the present disclosure is not limited thereto. The silica with antimony-doped tin oxide may be a core of silica with the antimony-doped tin oxide. The core may be hollow. However, the present disclosure is not limited thereto. The titanium-oxide with antimony-doped tin oxide may be a core of titanium-oxide with antimony-doped tin oxide. However, the present disclosure is not limited thereto.

According to a further aspect of the present disclosure, the bulk filler component is alumina. Using alumina for the bulk filler component may lead to advantageous DC properties of the insulation material. In addition, if the conductivity of functional fillers exceeds the preset limits of thermal runaway, the bulk filler component, which does not have field-grading properties, such as alumina, may help to reduce the overall conductivity of the composite.

According to a further aspect of the present disclosure, an average particle size of the functional filler component is within the range of 0.1 . . . 30 µm. Preferably, the average particle size of the bulk filler component, if present, is within the range of 0.3 . . . 10 µm. Alternatively or additionally, an average particle size of the bulk filler component, if present, is within the range of 1 . . . 5 µm.

The ranges given herein for the average particle size are based on a laser diffraction measurement, and each value within the range of values is a volume distributed mass-median diameter, i.e. a $D_{50}$ value. A typical laser diffraction measurement is conducted according to the guidelines set out in ISO 13320:2009.

In a typical laser diffraction measurement, a sample of the particles to be measured is dispersed in water solvent by a preparation technique disclosed in ISO 14887. An appropriate volume of the dispersion is caused to flow through a measurement zone by a recirculation system.

A light source comprising a laser and a suitable beam expander is provided for radiating the dispersed particles inside the measuring zone.

The measurement zone is disposed such that the particles are in a parallel beam of light before and within the working distance of a collecting lens. In the typical laser diffraction measurement described herein, the plurality of dispersed particles inside the measurement zone generates a scattering pattern. The scattering pattern will comprise several light intensities at different scattering angles. Together with the light intensity of the direct light, this scattering pattern forms the total angular light distribution. The total angular light distribution is focused by the collecting lens onto a detector device. The detector device is constructed such as to sample a discrete angular-sensitive spatial intensity distribution by employing a plurality of detector elements.

The plurality of detector elements is adapted to convert the discrete angular-sensitive spatial intensity distribution into a series of photocurrents which are subsequently converted into a set of energies which represent the scattering pattern.

The scattering pattern is collected during a measurement time sufficient for a statistically adequate representation of the sample. For example, the scattering pattern is collected for more than 10 minutes or for more than 30 minutes.

For calculation of the scattering matrix, the Mie approximation is used in order to represent the signal at each detector element per unit volume of particles in the different size classes. An inverse convolution (deconvolution) is performed mathematically in order to convert the scattering pattern into the particle size distribution.

The skilled person will understand that the particles have irregular shapes, e.g. particles having an irregular (non-uniform) surface structure or the like. Average sizes of particles, as used herein, are therefore understood as diameters that are measured on an irregular bulk and that are commonly averaged.

In laser-diffraction measurement techniques used to determine the average particle sizes of the particles in this application, the equivalent diameter is the diameter of a (regularly-shaped) sphere that yields the same size value when it is analyzed under the same conditions as the irregularly shaped particle.

Additionally, the average diameter was taken as correctly measured when particles were purchased with a specific given diameter in the meaning of particle size. Here, it is assumed that the particle size is not substantially influenced by the dispersion technique used.

The distribution width is defined by a distribution span of $$\text{SPAN} = \frac{D_{90} - D_{10}}{D_{50}}.$$

Herein, typically SPAN has a value of more than 0.5 and preferably more than 2.0.

In the context of this application, an average particle size within a range of e.g. 1 . . . 5 µm means a single averaged particle size of any of the average particle sizes from 1 µm to 5 µm. The laser diffraction measurement is, for example, conducted by employing a gas laser, such as a He—Ne laser, but is not limited thereto.

A low maximum achievable conductivity—while keeping a weak field grading property—is preferable in high voltage insulation. The highest conductivity at operating conditions (highest electric field and temperature) should not exceed $10^{-10}$ S/m to avoid excessive temperature increase in the insulation due to ohmic losses (thermal runaway) under high voltage stresses.

According to a further aspect of the present disclosure, the DC conductivity of the insulation material is within the range of $10^{-18}$ S/m to $10^{-10}$ S/m. Preferably, the DC conductivity of the insulation material is within the range of $10^{-17}$ S/m to $10^{-12}$ S/m. Even more preferably, the DC conductivity of the insulation material is within the range $10^{-15}$ S/m to $10^{-13}$ S/m. The ranges given herein for the DC conductivity of the insulation material are within a temperature range of 303 to 378 K when the insulation material is exposed to an electric field strength under normal DC operation of 1 kV-500 kV. An electric field strength of normal DC operation is considered to be within the range of 0 to 10 kV/mm.

As disclosed herein, the DC conductivity is measured after the application of a constant and homogeneous electric field within the range of normal DC operation for a time duration of at least 24 hours, preferably of at least 100 hours, more preferably of at least 240 hours.

It was found that the DC conductivity within the ranges given herein may lead to a smaller difference between the capacitive and the resistive field, when the suggested insulation material is used in connection with an insulator in the DC regime. A pure capacitive field occurs, for example, right after a switch-on transient, i.e. immediately after switching on the DC voltage to be applied to the insulator. Moreover, it was found that the DC conductivity within the ranges given herein may reduce the transition time from a capacitive field distribution to an ohmic (resistive) field distribution after such a switch-on transient.

According to a further aspect of the present disclosure, the DC conductivity is dependent on the electric field strength applied to the insulation material at a temperature of the insulation material at any one temperature within the range between 303 and 378 K, the electric field strength being in a range between a minimum electric field strength of 1 kV/mm and a maximum electric field strength of 10 kV/mm, such that the DC conductivity at the maximum electric field strength is less than $10^5$ times the DC conductivity at the minimum electric field strength.

Preferably, the DC conductivity is dependent on the electric field strength applied to the insulation material at a temperature of the insulation material at any one temperature within the range between 303 and 378 K, the electric field strength being in a range between a minimum electric field strength of 1 kV/mm and a maximum electric field strength of 5 kV/mm, such that the DC conductivity at the maximum electric field strength is less than $10^3$ times the DC conductivity at the minimum electric field strength.

It was found that a DC conductivity being dependent on an electric field strength in the ranges given herein may enable a self-limitation of the DC electric field and/or a more homogeneous field distribution.

According to a further aspect of the present disclosure, the DC conductivity is dependent on the temperature of the insulation material at any one field strength within the range between 0 kV/mm and 10 kV/mm, the temperature being in a range between a minimum temperature of 303 K and a maximum temperature of 378 K, such that the DC conductivity at the maximum temperature is less than $10^4$ times the DC conductivity at the minimum temperature.

Preferably, the DC conductivity is dependent on the temperature of the insulation material at any one field strength within the range between 0 kV/mm and 10 kV/mm, the temperature being in a range between a minimum temperature of 303 K and a maximum temperature of 378 K, such that the DC conductivity at the maximum temperature is less than $10^3$ times the DC conductivity at the minimum temperature.

Even more preferably, the DC conductivity is dependent on the temperature of the insulation material at any one field strength within the range between 0 kV/mm and 10 kV/mm, the temperature being in a range between a minimum temperature of 303 K and a maximum temperature of 378 K, such that the DC conductivity at the maximum temperature is less than $10^2$ times the DC conductivity at the minimum temperature.

The DC conductivities as referred to herein were measured according to common procedures known by the skilled person.

Particularly, in the case of a field strength-dependent DC conductivity at any one constant temperature within the range, a first DC conductivity was measured as the steady state conductivity at the respective temperature when the maximum electric field strength was applied for at least 24 hours, and the measurement equipment was connected to 2 mm thick plates of the insulator material under consideration. Similarly, a second DC conductivity was measured as the steady state conductivity at the respective temperature when the minimum electric field strength was applied for at least 24 hours, and the measurement equipment was connected to the same 2 mm thick plates. The first DC conductivity and the second DC conductivity at the constant temperature are then used to calculate the respective relationship.

Likewise, in the case of a temperature-dependent DC conductivity of any one constant electric field strength within the range, a first DC conductivity was measured as the steady state conductivity at the respective DC field strength when at the maximum temperature, wherein the electric field was applied for at least 24 hours, and the measurement equipment was connected to 2 mm thick plates. Similarly, a second DC conductivity was measured as the steady state conductivity at the respective DC field strength when at the minimum temperature, wherein the electric field was applied for at least 24 hours, and the measurement equipment was connected to 2 mm thick plates. The first DC conductivity and the second DC conductivity at the constant field strength are then used to calculate the respective relationship.

The matrix of the suggested insulation material is a thermoplastic or a thermoset polymer matrix. Preferably, the matrix is a thermoplastic polymer matrix, and it can comprise or consist of any suitable material such as polyethylene, polypropylene, ethylene propylene rubber, poly-4-methylpentene, polyvinylchloride, polymethylmethacrylate, polystyrene, polyoxymethylene, polyethylenterephthalate or bisphenol-A-polycarbonate. But also other materials such as resins and rubber materials can be used.

The skilled person is aware that the insulation material as suggested herein can further contain one or more optional additives selected from wetting/dispersing agent, plasticizer, antioxidant, light absorber, further additive(s), preferably less than 5% by weight for all above stated ingredients together based on the total weight of the insulation material. In particular, in order to improve the dispersion of filler particles in the polymer matrix the insulation material may comprise a dispersing agent to an amount of less than 5%, preferably less than 2% and most preferably less than 1% based on the total weight of the insulation material. Suitable dispersing agents are stearate esters, phosphoric acid esters such as phosphoric acid dimethyl esters, glycerol trioleat, dibutyl amine, sulfanates, polyethyleneglycol, stearic acid, citric acid and fish oils. Such dispersing agents can be directly added into the formulation. Also, surface treatment in addition to dispersing chemicals can be applied in the formulation to further improve the dispersion the filler particle. A suitable surface treating agent is for example hexamethyldisilazane (HMDS). Such surface treating agents can be used to couple the —OH polar groups on the particle surface. Suitable antioxidant agents are selected from the group comprising or consisting of phenols, phosphites, B-blends, hydroxylamines, aromatic amines, thioethers, lactones, metal deactivators and hindered amines. In particular antioxidants are suitably selected from the group comprising or consisting of Irganox 1010®, Irganox B 225®, Irganox B215®, Irganox B 561®, Irgafos 38®, Irgafos 126®, Irgafos 168®, Irgastab FS 042®, Irganox PS 800®, Irganox PS 802®, Irganox MD 1024®, Santonox R® and distearyl thiodipropionate. Also, the dispersion of filler particles in the polymer matrix the insulation material may comprise an antioxidant agent to an amount of less than 5%, preferably less than 2% and most preferably less than 1% based on the total weight of the insulation material.

According to another aspect, the insulation material suggested herein can be produced by a method which comprises the steps of combining a functional filler component having a non-linear resistive behavior depending on an applied electrical field strength and/or a non-linear capacitive behavior depending on an applied electrical field strength and having, at least in a temperature range of 0° C. to 120° C., a bandgap in the range of 2 to 5 eV, optionally in the range of 2 to 4 eV, and a thermoset or thermoplastic matrix; compounding the ingredients according to the type of matrix; and processing the compounded ingredients according to the type of matrix.

In compounding according to the type of the matrix, care is taken of whether a thermoset system or a thermoplastic system is used. Furthermore, in processing the compounded ingredients according to the type of the matrix, care is taken of whether a thermoset system or a thermoplastic system is used for forming the actual insulator. As a non-limiting example, in a thermoset system, casting and curing is performed, while in a thermoplastic system, injection molding is performed at a certain temperature.

According to a further aspect of the present disclosure, the insulation material suggested herein is used for a high voltage DC electrical component. Preferably, the insulation material suggested herein is used for a high voltage DC insulator. As to the definition of high voltage as used herein, reference is made to the explanations above.

The use of the insulation material is particularly directed to the use with a high voltage DC electrical component, the insulation material being any one of the insulation materials suggested herein.

In particular, according to a further aspect of the present disclosure, an insulation material as disclosed herein is used for a high voltage DC electrical component. In embodiments, the insulation material comprising a thermoset or thermoplastic matrix and a functional filler component, wherein the functional filler component has a non-linear DC conductivity depending on an applied electrical field strength, and wherein at least in a temperature range of 0° C. to 120° C., the functional filler component.

According to a further aspect of the present disclosure, a DC electrical component for high voltage DC power transmission or distribution is suggested, the DC electrical component comprising a conductor surrounded at least partially by an insulation layer of an insulation material as described herein. Again, as to the definition of high voltage as used herein, reference is made to the explanations above.

According to a further aspect of the present disclosure, the use of a DC electrical component for high voltage DC power transmission or distribution in a high voltage DC gas insulated device is suggested, the DC electrical component comprising a conductor surrounded at least partially by an insulation layer of an insulation material as described herein. Again, as to the definition of high voltage as used herein, reference is made to the explanations above. The high voltage DC gas insulated device is preferably, but not limited to, a gas insulated system (GIS) or a gas insulated line (GIL).

EXAMPLES

In the following, embodiments of the present disclosure are described by way of specific examples with reference to the drawings. The examples discussed below are not to be understood as limiting the scope of the disclosure to these specific embodiments. Rather, the examples are given for illustrating purposes, and the skilled person will understand that the disclosure can be implemented in a number of different ways and not only in the way as presented in the embodiments. For example, features illustrated or described as parts of one embodiment can be used in conjunction with any other embodiment or aspect, and the present disclosure includes any such variations and/or combinations.

Insulation materials were prepared and casted into thin sample plates having a thickness of 2 mm. For the purpose of comparison, a reference sample was casted, containing, as a filler, only $Al_2O_3$ particles of an average particle size of 3.0 μm ($D_{50}$, measured by laser diffraction, the same applies hereinafter). Various samples of insulation materials according to embodiments of the present disclosure were casted as well.

The average particle size of the fillers components used in the experiment can be derived from the following table 2:

TABLE 2

| Filler component | Average Particle size ($D_{50}$) [μm] | SPAN |
|---|---|---|
| $Al_2O_3$ | 3.0 | 2.8 |
| conductive Titnium oxide ($TiO_2[SnO_2, Sb_2O_3]$) | 1.6 | 3.7 |
| Titanium oxide core with antimony-doped tin oxide | 1.0 | n/a |
| ZnS | 0.3 | 2.2 |
| $TiO_2$ | 0.4 | 2.5 |
| $Cr_2O_3$ | 0.6 | 2.8 |
| $Fe_2O_3$ | 0.6 | 2.1 |
| $SnO_2$ | 0.5 | 2.7 |

In a series of DC conductivity tests, the samples were applied a voltage resulting in a homogenous DC electric field having a field strength of 1, 3 and 5 kV/mm for the various temperature of 30° C. (303 K), 70° C. (343 K) 105° C. (378 K) for approximately $10^5$ seconds, approximately 28 hours. After that time, the voltage still applied to the sample, the current through the samples was measured by means of a picoammeter. This current was used to calculate the conductivity. The DC conductivities of the total DC conductivity tests thus calculated are given in the following table 3, wherein the functional filler component is given after the + (plus) symbol, and the second filler component is given before the + (plus) symbol:

TABLE 3

| Filler formulation | E [kV/mm] | T [° C.] | DC conductivity [S/m] |
|---|---|---|---|
| 60 wt.-% $Al_2O_3$ (comparative example) | 1 | 30 | $1.0 \times 10^{-18}$ |
|  | 3 | 30 | $1.0 \times 10^{-18}$ |
|  | 5 | 30 | $1.0 \times 10^{-18}$ |
|  | 1 | 70 | $3.1 \times 10^{-16}$ |
|  | 3 | 70 | $3.1 \times 10^{-16}$ |
|  | 5 | 70 | $3.1 \times 10^{-16}$ |
|  | 1 | 105 | $1.1 \times 10^{-14}$ |
|  | 3 | 105 | $1.1 \times 10^{-14}$ |
|  | 5 | 105 | $1.1 \times 10^{-14}$ |
| 40 wt.-% $Al_2O_3$ + 20 wt.-% conductive Titanium oxide ($TiO_2[SnO_2, Sb_2O_3]$) | 1 | 30 | $3.1 \times 10^{-17}$ |
|  | 3 | 30 | $1.6 \times 10^{-16}$ |
|  | 5 | 30 | $1.4 \times 10^{-15}$ |
|  | 1 | 70 | $1.5 \times 10^{-16}$ |
|  | 3 | 70 | $4.0 \times 10^{-16}$ |
|  | 5 | 70 | $5.5 \times 10^{-15}$ |
|  | 1 | 105 | $5.35 \times 10^{-16}$ |
|  | 3 | 105 | $5.1 \times 10^{-15}$ |
|  | 5 | 105 | $5.9 \times 10^{-14}$ |
| 20 wt.-% $Al_2O_3$ + 40 wt.-% $Fe_2O_3$ | 1 | 30 | $6.9 \times 10^{-17}$ |
|  | 3 | 30 | $4.9 \times 10^{-16}$ |
|  | 5 | 30 | $7.4 \times 10^{-15}$ |
|  | 1 | 70 | $2.3 \times 10^{-16}$ |
|  | 3 | 70 | $1.6 \times 10^{-15}$ |
|  | 5 | 70 | $4.1 \times 10^{-14}$ |
|  | 1 | 105 | $1.4 \times 10^{-15}$ |
|  | 3 | 105 | $2.0 \times 10^{-14}$ |
|  | 5 | 105 | $5.9 \times 10^{-13}$ |
| 10 wt.-% $Al_2O_3$ + 55 wt.-% $Cr_2O_3$ | 1 | 30 | $6.2 \times 10^{-17}$ |
|  | 3 | 30 | $3.7 \times 10^{-16}$ |
|  | 5 | 30 | $5.1 \times 10^{-15}$ |
|  | 1 | 70 | $2.0 \times 10^{-16}$ |
|  | 3 | 70 | $1.4 \times 10^{-14}$ |
|  | 5 | 70 | $1.5 \times 10^{-13}$ |
|  | 1 | 105 | $3.5 \times 10^{-15}$ |
|  | 3 | 105 | $2.4 \times 10^{-13}$ |
|  | 5 | 105 | $1.6 \times 10^{-12}$ |
| 30 wt.-% $Al_2O_3$ + 30 wt.-% $SnO_2$ | 1 | 30 | $1.8 \times 10^{-18}$ |
|  | 3 | 30 | $5.65 \times 10^{-18}$ |
|  | 5 | 30 | $145 \times 10^{-17}$ |
|  | 1 | 70 | $2.1 \times 10^{-17}$ |
|  | 3 | 70 | $7.0 \times 10^{-17}$ |
|  | 5 | 70 | $2.9 \times 10^{-16}$ |
|  | 1 | 105 | $8.5 \times 10^{-16}$ |
|  | 3 | 105 | $3.7 \times 10^{-15}$ |
|  | 5 | 105 | $1.0 \times 10^{-14}$ |

Figure 1A:
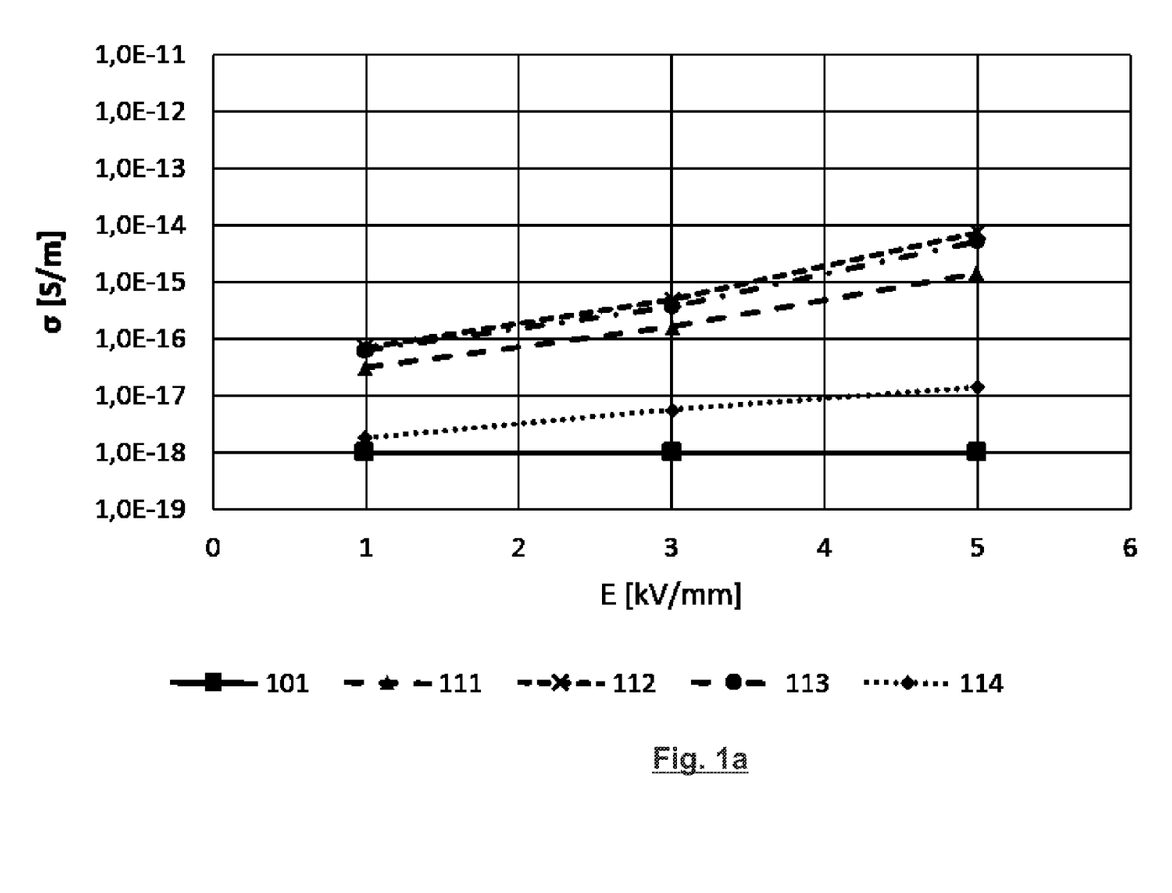
FIG. 1a is a diagram showing conductivities of exemplary insulation materials according to embodiments of the present disclosure, in dependence of the electric field, at 30° C.
Figure 1B:
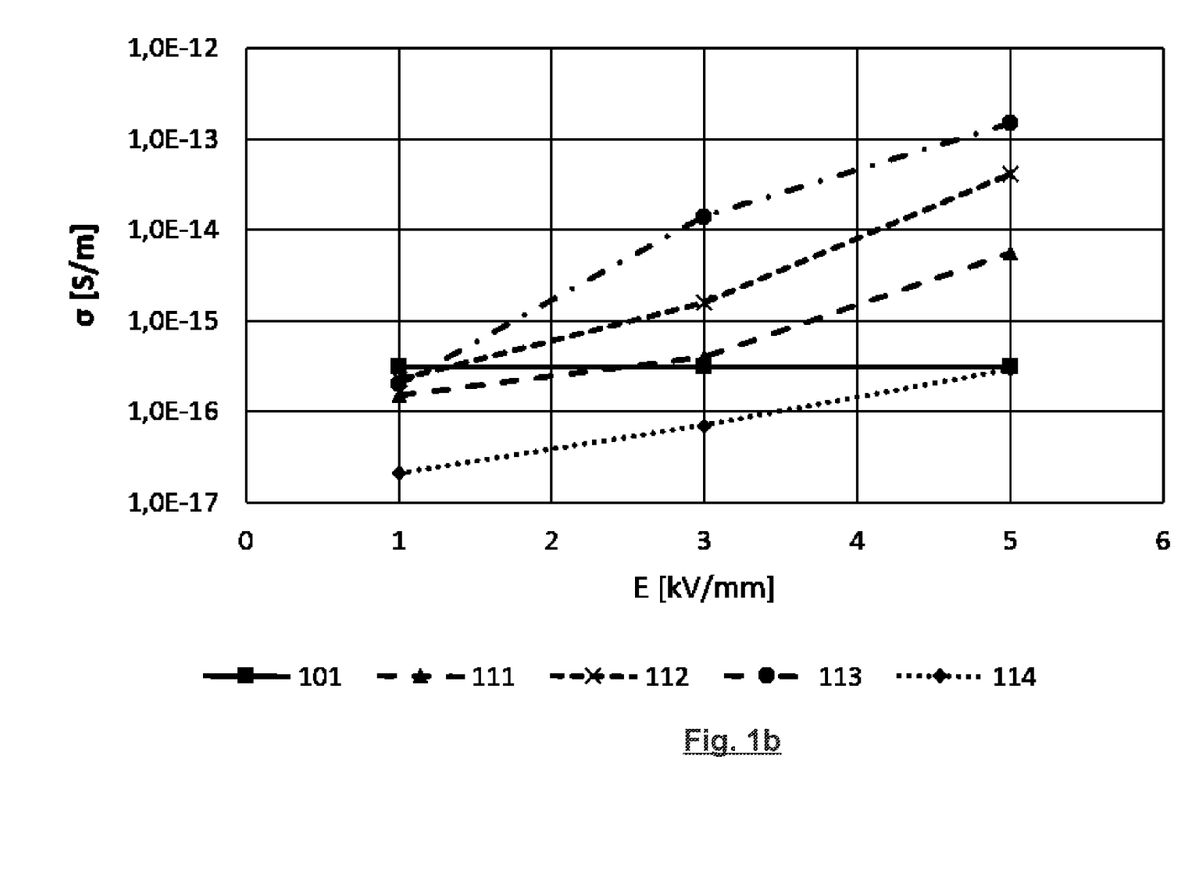
FIG. 1b is a diagram showing conductivities of exemplary insulation materials according to embodiments of the present disclosure, in dependence of the electric field, at 70° C.
Figure 1C:
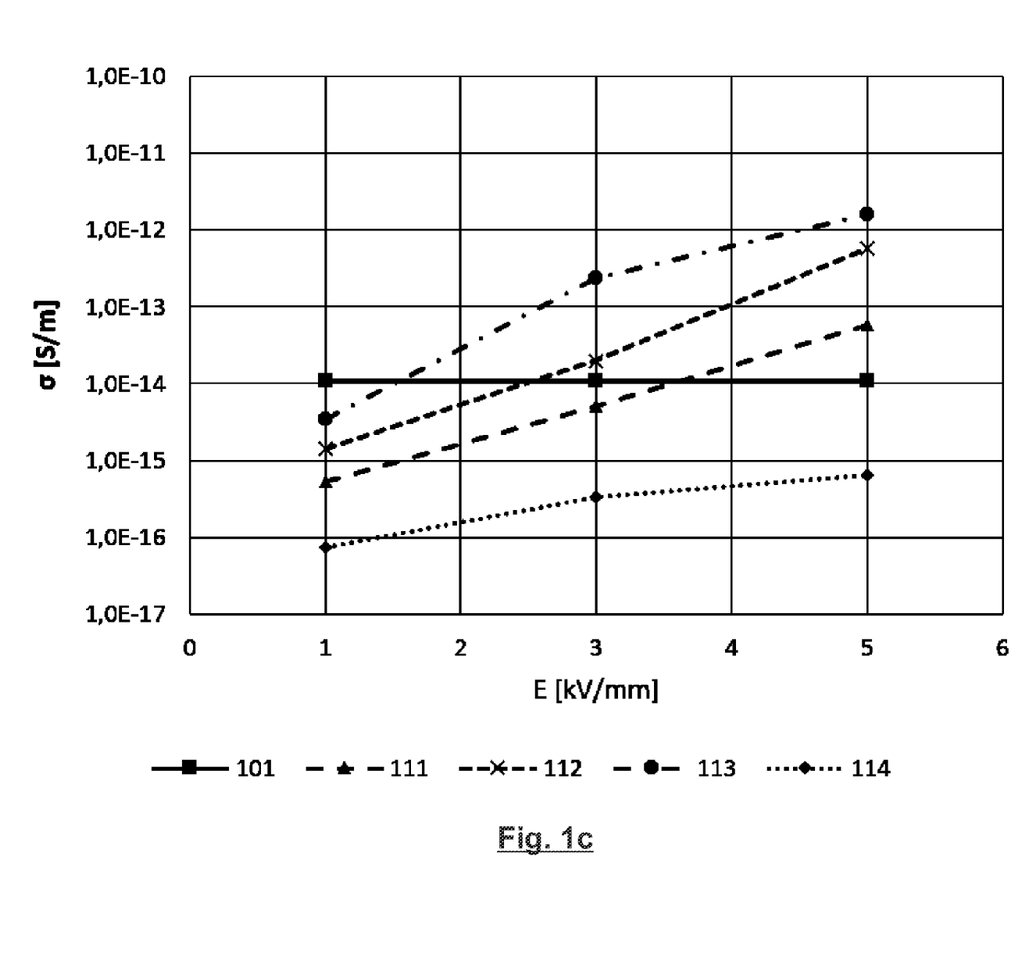
FIG. 1c is a diagram showing conductivities of exemplary insulation materials according to embodiments of the present disclosure, in dependence of the electric field, at 105° C.

FIGS. 1a, 1b, 1c are diagrams showing conductivities of exemplary insulation materials according to embodiments of the present disclosure, in dependence of the electric field for the various temperatures above. The conductivities of the DC conductivity tests for some materials are plotted in the graph of FIG. 1, i.e. for 1, 3, 5 kV/mm at 30, 70, 105° C.

Here, 101 denotes a field-dependence line between the measurement values of a filler containing only 60 wt.-% of $Al_2O_3$. 111 denotes a field-dependence line between the measurement values of a filler containing 40 wt.-% $Al_2O_3$+ 20 wt.-% $TiO_2[SnO_2, Sb_2O_3]$. 112 denotes a field-dependence line between the measurement values of a filler containing 20 wt.-% $Al_2O_3$+40 wt.-% $Fe_2O_3$. 113 denotes a field-dependence line between the measurement values of a filler containing 10 wt.-% $Al_2O_3$+55 wt.-% $Cr_2O_3$. 114 denotes a fictive line between the measurement values of a filler containing 30 wt.-% $Al_2O_3$+30 wt.-% $SnO_2$.

As clearly derivable from the table 3 and the graph of FIG. 1, an insulation material containing a relatively high amount of filler comprising a functional filler component as suggested herein, exhibits advantageous properties. For the exemplary operating conditions shown, all lines 111 to 114 show the field-dependence and weak non-linear behavior, i.e. the conductivities of the insulation material suggested herein are superior to those of a conventional insulation material. Yet, a thermal runaway is avoided.

In a DC breakdown strength test, the DC breakdown properties of a third selection of samples was measured in a standard test procedure.

It was found that the DC breakdown strength decreased in all of the samples comprising one of the insulation materials suggested herein. As compared to the pure aluminum oxide filler, the breakdown strength results are still above the requirement for application in typical DC applications such as DC gas insulated systems.

While these conductivities are still low enough in order to avoid any thermal runaway, the distribution of the electrical field on the insulator surface improves significantly. This makes charge accumulation on the surface more difficult, leading to better electrical properties in the DC regime. Also, the resistive field maximum will be reduced, e.g. after a switch-on operation of the DC voltage. Hence, the transition time needed in order to return to a stable equilibrium (a resistive DC field distribution) is lessened. This, in turn, alleviates a charge accumulation in the DC regime even more.

Figure 2A:
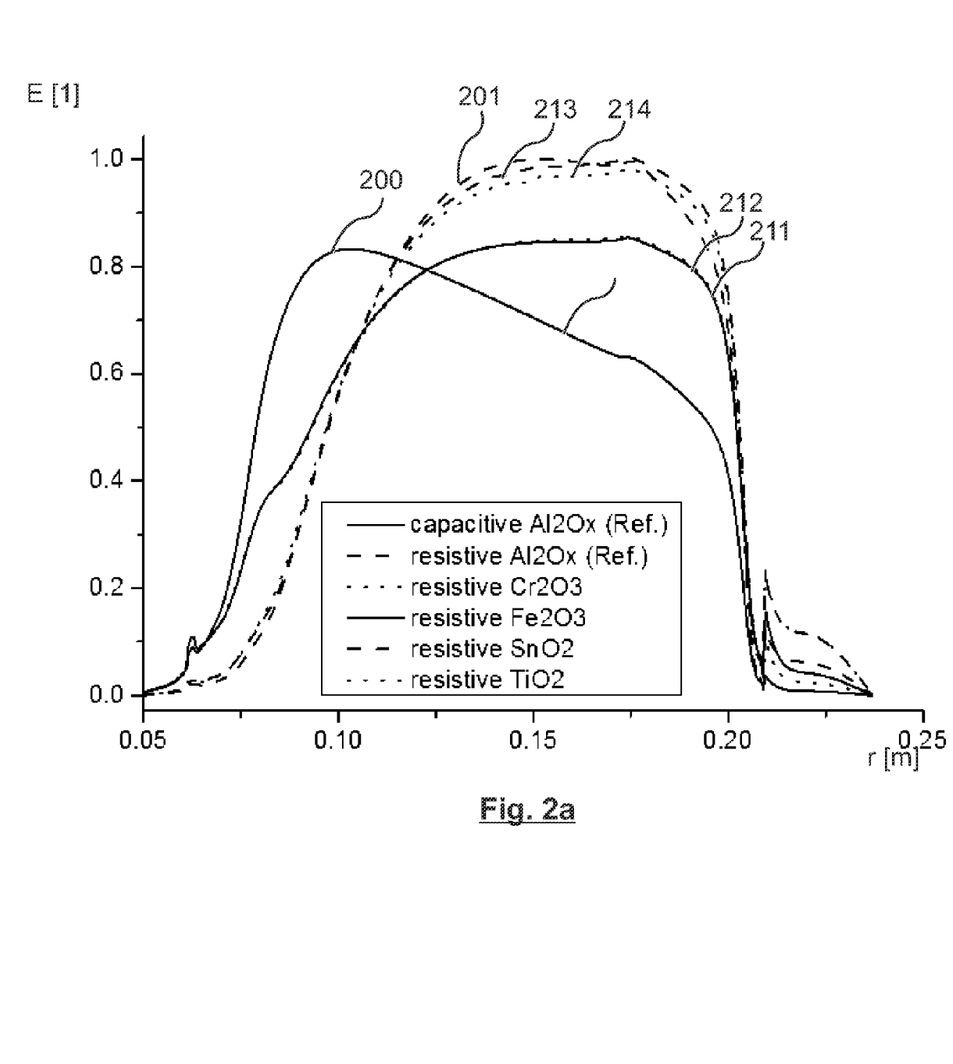
FIG. 2a is a diagram showing simulation results of the normalized electric field strength at the gas-solid interface under capacitive conditions, under ohmic conditions using a conventional insulation material, and under ohmic conditions using an exemplary insulation material according to an embodiment of the disclosure, in dependence of the radius of a modeled insulator.
Figure 2B:
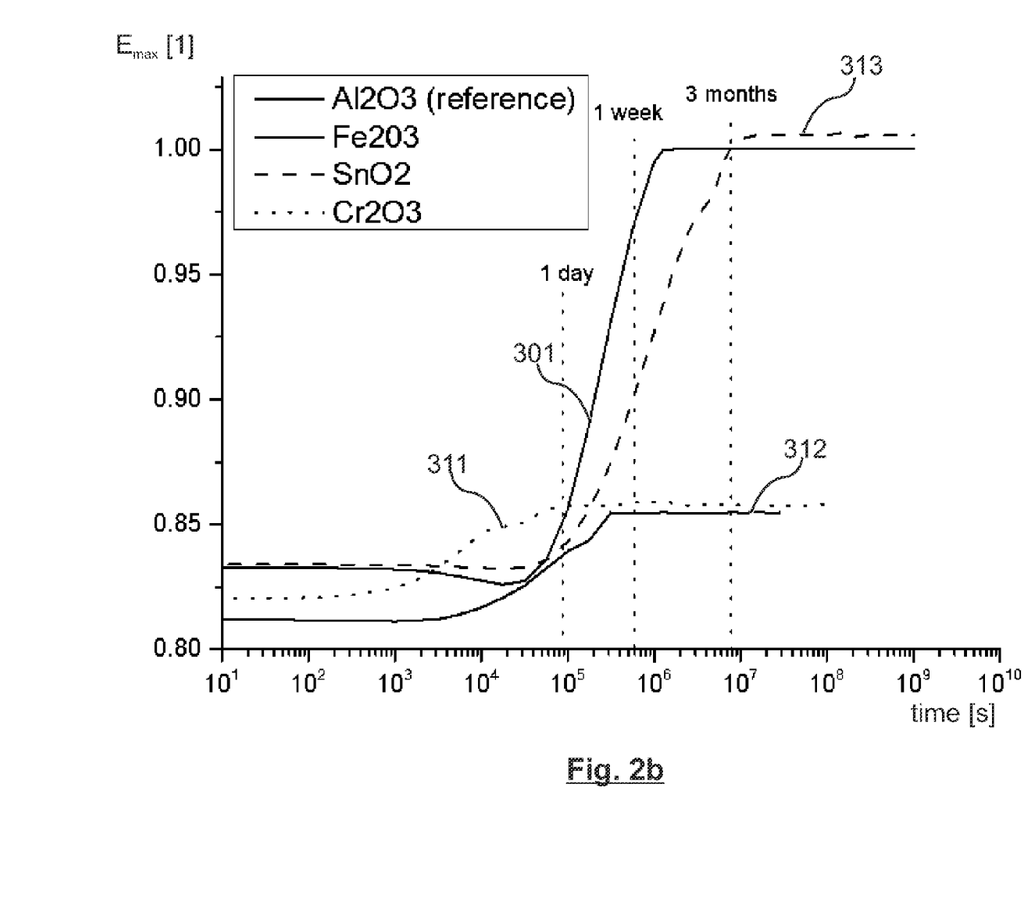
FIG. 2b is a diagram showing simulation results of the normalized maximum electric field strength at the gas-solid interface under ohmic conditions using a conventional insulation material, and under ohmic conditions using an exemplary insulation material according to an embodiment of the disclosure, in dependence of time, on the surface of a modeled insulator.

In the diagram shown in FIG. 2a, the DC electric field strength on the surface of insulators having a standard shape is shown, dependent on the distance r from the center of the respective insulator. The diagram of FIG. 2b shows the maximum DC electric field strength on the same insulator dependent on time. The graphs shown in FIGS. 2a and 2b are simulation results of the electric field strength on a modeled standard-shaped insulator. The electric field strengths were normalized to the maximum electric field strength in the case of a pure capacitive field as discussed below.

Figure 3:
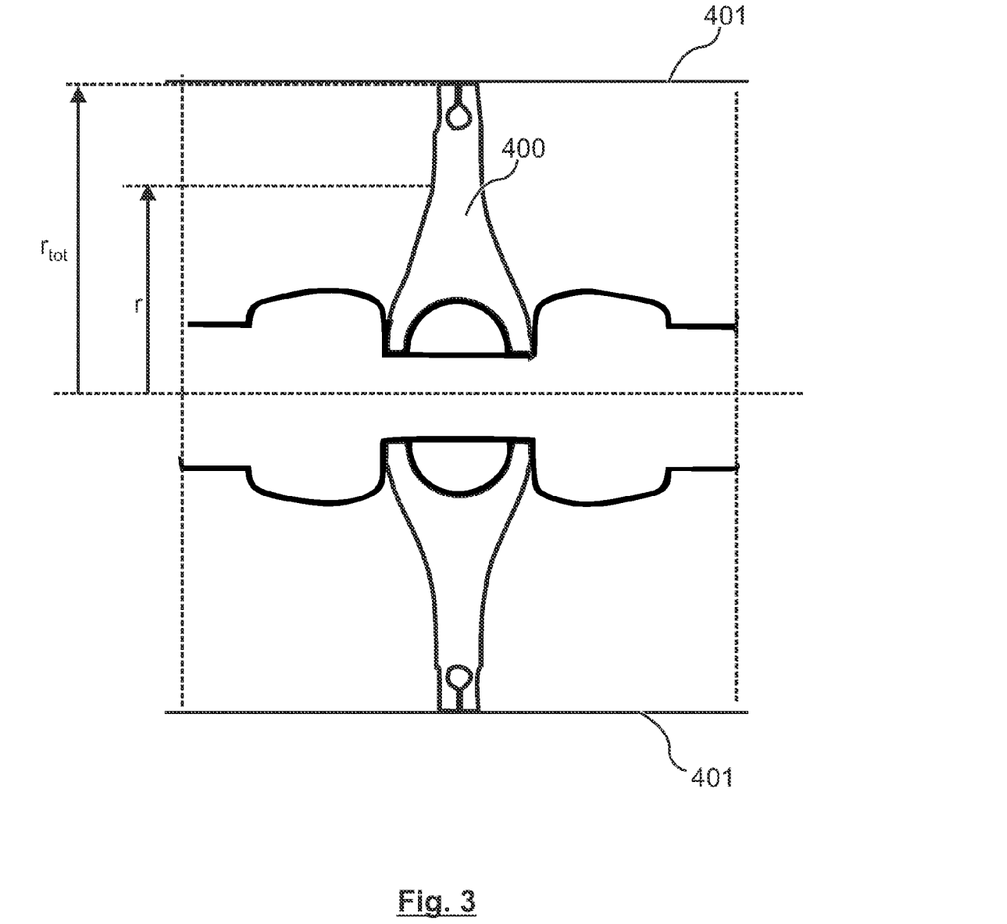
FIG. 3 is a schematic sectional view of the modeled insulator used in the simulations shown in FIGS. 2a and 2b.

For convenience, a schematic sectional view of the insulator used in the simulations of FIGS. 2a and 2b is shown in FIG. 3. Here, reference numeral 400 denotes the insulator bulk of the respective material, $r_{tot}$ denotes the total radius, and r denotes the radial distance on the insulator surface, wherein a single r is shown as an example. A grounded enclosure is denoted by reference numeral 401.

As seen in FIG. 2b, it could also be shown in the simulations that the transition time from a capacitive field after a switch-on transient to a resistive field, i.e. the transition time to a steady-state operation, is reduced significantly when a novel insulation material is used for a DC electrical component such as an insulator, compared to using a conventional insulation material.

In the diagram of FIG. 2a, simulation results of the normalized DC electric field strength on the insulator surface dependent on the insulator radius are shown. For convenience of comparison, the simulation results when using a conventional insulator material are shown in the same graph as the simulation results when using some of the insulation materials suggested herein.

For a conventional material, the normalized capacitive electric field strength (i.e. after a switch-on transient of the DC electric field) on the insulator surface of an insulation material containing only 60 wt.-% $Al_2O_3$ as a filler is shown as a solid-line reference curve 200. A dashed-line reference curve 201 is shown as the normalized resistive electric field strength of an insulation material containing only 60 wt.-% $Al_2O_3$ as a filler.

The further curves show the normalized resistive electric field strengths on the insulator surface of insulation materials containing, as a filler, a mixture of 30 wt.-% $Al_2O_3$ as a bulk filler component and 30 wt.-% of a functional filler component, the functional filler component being $Cr_2O_3$ for the dashed-line curve 211;
$Fe_2O_3$ for the solid-line curve 212;
$SnO_2$ for the dashed-line curve 213; and
$TiO_2$ for the dotted-line curve 214.

The advantageous conductivity of the novel insulation material keeps the charge accumulation low, such that the maximum electric field strength on the insulator surface is only slightly higher than that of the pure capacitive field.

In the diagram of FIG. 2b, simulation results of the normalized maximum DC electric field strength on the insulator surface dependent on time are shown. Time, on the abscissa, is logarithmically scaled; from time 0 on, a homogeneous DC electric field was applied, as discussed above. For convenience of comparison, the simulation result when using a conventional insulator material is shown in the same graph as the simulation results when using some of the insulation materials suggested herein.

In FIG. 2b, the time-dependent charge accumulation on an insulator comprising a reference insulation material containing only 60 wt.-% $Al_2O_3$ as a filler is shown as a solid-line reference curve 301.

Curves 311 through 313 show the normalized maximum DC electric field strength on the insulator surface of insulation materials containing, as a filler, a mixture of 30 wt.-% $Al_2O_3$ as a bulk filler component and 30 wt.-% of a functional filler component, the functional filler component being $Cr_2O_3$ for the dashed-line curve 311;
$Fe_2O_3$ for the solid-line curve 312; and
$SnO_2$ for the dotted-line curve 313.

For convenience, dash-dotted vertical lines indicate, from the left to the right, times corresponding to one day, one week, and three months after the beginning of an application of the DC electric field.

As can be seen from the diagram in FIG. 2b, already after one day, the electric field strength increases considerably for the reference material (filler comprising 60 wt.-% $Al_2O_3$), whereas for the suggested insulation materials comprising $Cr_2O_3$ or $Fe_2O_3$ as a functional filler component, increases only slightly and remains on a lower level thereafter in a stable state.

The invention claimed is:

1. An insulation material for a direct current (DC) electrical component, the insulation material comprising:
   a thermoset or thermoplastic matrix;
   a functional filler component combined with the thermoset or thermoplastic matrix and comprising any one of the group consisting of silica with antimony-doped tin oxide, titanium oxide with antimony doped tin oxide, and n-type tin oxide; and
   a bulk filler component,
   wherein the functional filler component has a non-linear DC conductivity depending on an applied electrical field strength,
   wherein at least in a temperature range of 0° C. to 120° C., the functional filler component has a bandgap in the range of 2 to 5 eV,
   wherein a DC conductivity of the insulation material measured after the application of a constant and homogeneous electric field of a field strength under normal DC operation for a time duration equal or longer than $10^5$ seconds, is within the range of $10^{-18}$ siemens per meter (S/m) to $10^{-10}$ S/m for 303 to 378 K, or a DC conductivity is dependent on the electric field strength applied to the insulation material at a temperature of the insulation material of any one temperature within the range between 303 and 378 K, for the electric field strength being in a range between a minimum electric field strength of 1 kV/mm and a maximum electric field strength of 10 kV/mm, such that the DC conductivity at the maximum electric field strength is less than $10^5$ times the DC conductivity at the minimum electric field strength.

2. The insulation material according to claim 1, wherein the total amount of the functional filler component within the insulation material is within the range of 30 to 80 wt.-%.

3. The insulation material according to claim 1, wherein the amount of the bulk filler component in the insulation material is within the range of up to 50 wt.-%.

4. The insulation material according to claim 3 wherein the bulk filler component is alumina.

5. The insulation material according to claim 1, wherein an average particle size of the functional filler component is within the range of 0.1 to 30 μm.

6. The insulation material according to claim 1, wherein a DC conductivity is dependent on the temperature of the insulation material at any one field strength within the range between 0 kV/mm and 10 kV/mm, such that the DC conductivity at the maximum temperature is less than $10^4$ times the DC conductivity at the minimum temperature.

7. A DC electrical component for high voltage DC power transmission or distribution, the DC electrical component comprising a conductor surrounded at least partially by an insulation layer of an insulation material according to claim 1.

8. The insulation material according claim 1, wherein the total amount of the functional filler component within the insulation material is within the range of 55 to 75 wt.-%.

9. The insulation material according to claim 1, wherein a DC conductivity is dependent on the temperature of the insulation material at any one field strength within the range between 0 kV/mm and 10 kV/mm, such that the DC conductivity at the maximum temperature is less than $10^4$ times the DC conductivity at the minimum temperature.

10. A method for producing an insulation material comprising the steps of:
   combining a functional filler component having a non-linear resistive behavior depending on an applied electrical field strength and/or a non-linear capacitive behavior depending on an applied electrical field strength and having, at least in a temperature range of 0° C. to 120° C., a bandgap in the range of 2 to 5 eV, optionally in the range of 2 to 4 eV; and comprising any one of the group consisting of silica with antimony-doped tin oxide, titanium oxide with antimony doped tin oxide, and n-type tin oxide, a bulk filler component, and a thermoset or thermoplastic matrix compounding the ingredients according to the type of matrix, and processing the compounded ingredients according to the type of matrix, wherein a DC conductivity of the insulation material measured after the application of a constant and homogeneous electric field of a field strength under normal DC operation for a time duration equal or longer than $10^5$ seconds, is within the range of $10^{-18}$ siemens per meter (S/m) to $10^{-10}$ S/m for 303 to 378 K, or a DC conductivity is dependent on the electric field strength applied to the insulation material at a temperature of the insulation material of any one temperature within the range between 303 and 378 K, for the electric field strength being in a range between a minimum electric field strength of 1 kV/mm and a maximum electric field strength of 10 kV/mm, such that the DC conductivity at the maximum electric field strength is less than $10^5$ times the DC conductivity at the minimum electric field strength.

\* \* \* \* \*